US009245251B2

(12) United States Patent  
Lyle et al.

(10) Patent No.: US 9,245,251 B2
(45) Date of Patent: Jan. 26, 2016

(54) MANAGING ELECTRONIC STICKY NOTES

(75) Inventors: Ruthie D. Lyle, Durham, NC (US); Demethria J. Ramseur, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 11/490,418

(22) Filed: Jul. 20, 2006

(65) Prior Publication Data

US 2008/0022195 A1      Jan. 24, 2008

(51) Int. Cl.
*G06F 17/00* (2006.01)
*G06F 15/16* (2006.01)
*G06F 3/048* (2013.01)
*G06Q 10/10* (2012.01)

(52) U.S. Cl.
CPC ........................................ *G06Q 10/10* (2013.01)

(58) Field of Classification Search
CPC .......... G06F 17/00; G06F 15/16; G06F 3/048
USPC ................................... 715/230, 764; 709/206
See application file for complete search history.

(56) References Cited

U.S. PATENT DOCUMENTS

| | | | | |
|---|---|---|---|---|
| 5,958,005 | A * | 9/1999 | Thorne et al. | 709/202 |
| 6,240,451 | B1 * | 5/2001 | Campbell et al. | 709/224 |
| 6,529,943 | B1 * | 3/2003 | Ohi | 709/206 |
| 6,898,618 | B1 * | 5/2005 | Slaughter et al. | 709/203 |
| 7,509,491 | B1 * | 3/2009 | Wainner et al. | 713/163 |
| 2003/0055713 | A1 * | 3/2003 | Pinto et al. | 705/10 |
| 2003/0225843 | A1 * | 12/2003 | Sakata | 709/206 |
| 2004/0039801 | A9 * | 2/2004 | Srinivasan et al. | 709/221 |
| 2004/0078750 | A1 * | 4/2004 | Frank | 715/500 |
| 2005/0188018 | A1 * | 8/2005 | Endo et al. | 709/206 |
| 2005/0195788 | A1 * | 9/2005 | Villain et al. | 370/341 |
| 2005/0223315 | A1 | 10/2005 | Shimizu et al. | 715/512 |
| 2005/0289474 | A1 * | 12/2005 | Master et al. | 715/765 |
| 2006/0036588 | A1 | 2/2006 | Frank et al. | 707/3 |
| 2006/0218501 | A1 * | 9/2006 | Wilson et al. | 715/769 |
| 2008/0189364 | A1 * | 8/2008 | Landon et al. | 709/204 |

FOREIGN PATENT DOCUMENTS

| | | | |
|---|---|---|---|
| EP | 375138 A3 | * | 8/1992 |
| EP | 375139 | * | 8/1992 |
| WO | WO 2006002289 A2 | * | 1/2006 |

* cited by examiner

*Primary Examiner* — Tadeese Hailu
*Assistant Examiner* — Darrin Hope
(74) *Attorney, Agent, or Firm* — Yee & Associates, P.C.; Lisa Ulrich

(57) ABSTRACT

System, method and program for managing electronic sticky notes. At a first workstation, a user defines content of an electronic sticky and specifies one or more workstations to receive and display the electronic sticky note. The first workstation sends to a server, via one or more networks, a definition of the electronic sticky note and the specification of the one or more workstations to receive and display the electronic sticky note. The server sends a request, via one or more networks, to the one or more workstations to display the electronic sticky note. The request includes a definition of the electronic sticky note. The server can verify that the one or more workstations are currently on line and/or verify that the user is authorized to send the electronic sticky note to the one or more workstations.

20 Claims, 4 Drawing Sheets

MANAGING ELECTRONIC STICKY NOTES

FIELD OF THE INVENTION

The present invention relates generally to computer systems, and more specifically to "electronic sticky notes" displayable on computer screens.

BACKGROUND OF THE INVENTION

Electronic sticky notes are well known today. For example, a Magic Notes program by Eskil Software and Jhoos Sticky Postit Notes1.0 program by Jhoos sticky Postit Notes allow a user to create electronic sticky notes. Electronic sticky notes resemble tangible paper stick-on notes, although electronic sticky notes are displayed on a computer screen. Typically there is a reminder message printed on the electronic sticky note, such as a "Pick up the kids" or "Prepare report on productivity". The user enters text for the electronic sticky note through his or her workstation (where the electronic sticky note application executes), and the electronic sticky note appears on the computer screen of the same workstation where it was created. The electronic sticky note can appear in the "desktop" display or on top of another window in the display, as specified by the person who created the electronic sticky note. Generally, electronic sticky notes are personal reminders to the person who created them.

Other types of messages are also known. For example, instant messaging such as Microsoft Instant Messenger program and IBM Sametime program are known to create "chat" sessions. One person at a workstation initially specifies a group of people by name who are invited to a chat session or can select an icon representing a predefined group of such people. For example, the user defines a group of instant messaging "buddies" in a list at a client workstation. The members often make up a group when the client connects to the instant messaging server. The server keeps track of the participants of each chat session. For example, the server returns status information (online, available, etc.) for each member. When the person types a message on his or her workstation, it appears in a chat session window on his or her workstation, and the workstation also sends it to the server with an identity of the originator of the message and the identity of the group of people in the chat session. In response, the server identifies the other members/participants of the group. Then, the server sends the message to the instant messaging clients on the workstations of the other members/participants in the group where the message appears on the display screens of these other workstations. This occurs in near real time. Upon receipt, the workstation of each member/participant displays in a chat session window the message sent by the originator along with the identity of the originator. Unlike, electronic sticky notes, instant messaging is a live, typically two-way communication between the participants. Generally, the sender of the instant message expects an instant message response or some other form of acknowledgment from the recipient.

Electronic mail or "e-mail" is also well known. A person creates text for an e-mail at his or her workstation, and specifies one or more recipients by their e-mail addresses. The person then "sends" the e-mail, and it proceeds to an Internet Service Provider which identifies the Internet Protocol addresses of the recipients. The ISP then forwards the e-mail to each recipient, and it proceeds through routers, network switches, firewalls, and/or other ISPs to the intended recipients. At the recipient's workstation, there is a note that the e-mail is waiting to be read, and the recipient can then request the e-mail from his or her ISP.

An object of the present invention is to improve usefulness and versatility of "electronic sticky notes".

SUMMARY OF THE INVENTION

The present invention resides in a system, method and program for managing electronic sticky notes. At a first workstation, a user defines content of an electronic sticky and specifies one or more workstations to receive and display the electronic sticky note. The first workstation sends to a server, via one or more networks, a definition of the electronic sticky note and the specification of the one or more workstations to receive and display the electronic sticky note. The server sends a request, via one or more networks, to the one or more workstations to display the electronic sticky note. The request includes a definition of the electronic sticky note.

According to features of the present invention, after the first workstation sends to the server the definition of the electronic sticky note and the specification of the one or more workstations to receive and display the electronic sticky note, and before the server sends the request to the one or more workstations, the server verifies that the one or more workstations are currently on line and/or verifies that the user is authorized to send the electronic sticky note to the one or more workstations.

According to another feature of the present invention, the request also includes instructions for how to display the electronic sticky note at the one or more workstations.

According to another feature of the present invention, the user owns the one or more workstations.

According to another feature of the present invention, a user at any of the workstations that currently displays the electronic sticky note can update the electronic sticky note for display at all of the workstations.

DETAILED DESCRIPTION OF THE PREFERRED EMBODIMENTS

Figure 1:
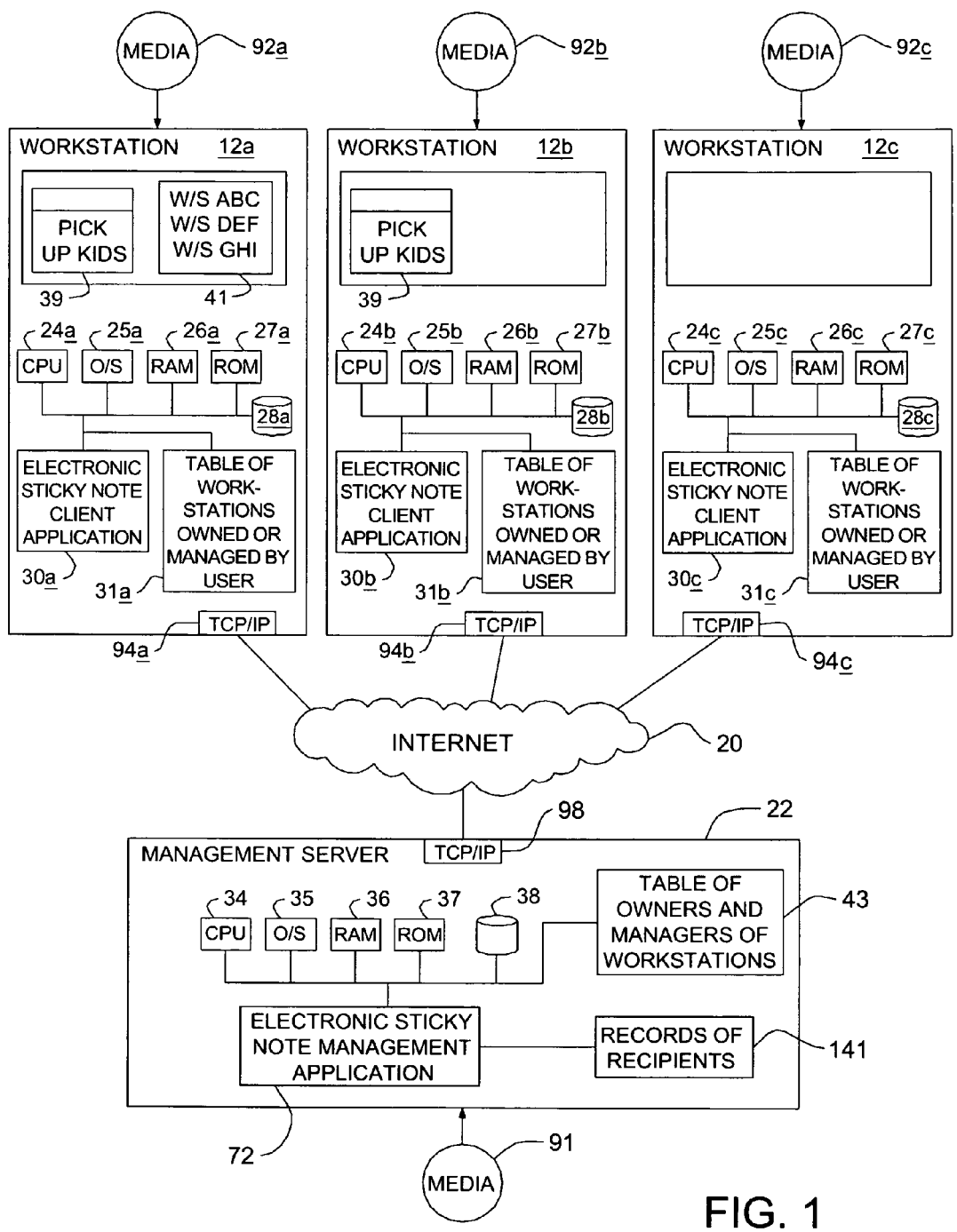
FIG. 1 is a block diagram of a distributed computer system, including electronic sticky note client applications in respective client workstations, and an electronic sticky note management application in a server, according to the present invention.

The present invention will now be described in detail with reference to the figures. FIG. 1 illustrates a distributed computer system generally designated 10 according to the present invention. System 10 comprises multiple client workstations 12a,b,c interconnected to each other via a network 20 such as the Internet. The client workstations can be desk top computers, laptop computers, PDAs or other types of stationary or mobile computing devices. An electronic sticky note management server 22 is also connected to client workstations 12a, b,c via network 20. Client workstations 12a,b,c include known CPU 24a,b,c, operating system 25a,b,c, RAM 26a,b,c, ROM 27a,b,c and storage 28a,b,c respectively. Client workstations 12a,b,c also include electronic sticky note client applications 30a,b,c respectively according to the present invention. Server 22 includes a known CPU 34, operating system 35, RAM 36, ROM 37 and storage 38. RAM 26a,b,c, ROM 27a,b,c, RAM 36, and ROM 37 are examples of a memory. Storage 28a,b,c and storage 38 are examples of a computer readable storage. Program instructions are stored in a functional form in the computer readable storage for execution by a CPU via a memory in these examples. Server 22 also includes an electronic sticky note management application 72 according to the present invention. Applications 30a,b,c allow users at the respective workstations 12a,b,c to create electronic sticky notes at the respective workstations, and designate any or all of the other workstations to receive and display a copy of the electronic sticky note. For example, a user at workstation 12a can define an electronic sticky note 39 and specify that workstation 12a as well as workstation 12b should display the electronic sticky note. Electronic sticky note 39 preferably resembles a tangible paper stick-on note, although electronic sticky note 39 is displayed on a computer screen. Typically there is a reminder message printed on the electronic sticky note, such as a "Pick up kids" or "Prepare report on productivity". In general, electronic sticky notes are reminders, typically for the person who created them. The user specifies workstation 12a to display the electronic sticky note by specifying the IP address of workstation 12a or selecting the workstation 12a from a pull down menu 41 which lists all the workstations that can receive and display the electronic sticky note generated at the originating workstation 12a. The user specifies the other workstation 12b to receive and display the electronic sticky note by specifying the IP address of workstation 12b or selecting the other workstation 12b from pull down menu 41. The user previously populated pull down menu 41 with IP addresses or other identifier of workstations 12a,b,c. Typically, the workstations to which a user can send or "push" an electronic sticky note are owned or managed by the user/person creating the electronic sticky note. An administrator previously entered into a table 43 in server 22 a list of all workstations owned or managed by each user. Next, the originating workstation sends to server 22 the text of the electronic sticky note, instructions for the manner of its display and an identification of workstations to receive and display the electronic sticky note. In response, server 22 determines which of the intended recipient workstations (in the foregoing example, workstations 12a,b) are currently on line and forwards them the electronic sticky note and instructions for its display. Upon receipt of the electronic sticky note at workstation 12a, the electronic sticky note application 30a at workstation 12a displays the electronic sticky note. Upon receipt of the electronic sticky note at workstation 12b, the electronic sticky note application 30b at workstation 12b displays the electronic sticky note as if it were created at workstation 12b.

FIG. 2 illustrates the implementation and function of each of the electronic sticky note client applications 30a,b,c in respective workstations 12a,b,c, and electronic sticky note management application 72 in server 22, in more detail in the process of creating an original electronic sticky note on an originating workstation and communicating the electronic sticky note information to management server 22. In response, server 22 sends the electronic sticky note information to the selected workstations where it is displayed. For purposes of explanation, assume that a user at workstation 12a creates the original electronic sticky note. In step 100, the user at workstation 12a authenticates himself or herself (with a user ID and password) and invokes electronic sticky note client application 30a. In response, application 30a determines if the user has already defined (by IP address and Internet communication protocol) a list of Internet-enabled candidate devices such as workstations 12a,b,c that can receive electronic sticky notes generated at workstation 12a (decision 102). If not (decision 102, no branch), then application 30a queries the user to define these workstations by specifying their respective IP addresses, Internet communication protocols and instructions for displaying the content (step 104). Typically, the user is the owner of or authorized manager for all of the workstations that are identified as candidates to receive the electronic sticky notes generated at workstation 12a. Application 30a includes a table 31a which lists which workstations are owned or managed by the user. (Similarly, applications 30b and 30c includes tables 31b and 31c, respectively, which list which workstations are owned or managed by each user.) Examples of Internet communication protocols are ftp, http and SIp. Examples of instructions for displaying the content are remove all graphics and bold title text and the date upon which the electronic sticky note should be deleted and no longer displayed. After the user specifies the IP addresses, Internet communication protocols and instructions for displaying the electronic sticky note at the workstations specified in step 104 or if they were previously defined (decision 102, yes branch), then program 30a displays the list or workstations (such as workstations 12a,b,c) in pull down menu 41 and the user selects (with a mouse or keyboard) one or more of the workstations 12a,b,c to receive and display the electronic sticky note (step 106). (If desired, the user can choose not to display the electronic sticky note on workstation 12a.) If the list was predefined and did not include all the workstations to receive the electronic sticky note (decision 110, no branch), then program 30a loops back to step 104 to query the user to enter the respective IP addresses, Internet communication protocols and instructions for displaying the electronic sticky note at the other workstations. After the user selects all the workstations to receive and display the electronic sticky note (decision 110, yes branch), application 30a presents a text field or queries the user for the text or other content of the electronic sticky note (step 120). In response, the user enters the text or other content of the electronic sticky note. Next, program 30 bundles the content of the electronic sticky note with the instructions for display, and the preferred communication protocols and the IP address(es) of the workstations selected in step 106 to receive and display the electronic sticky note (step 124). (Management server 22 can use the indication of the preferred communication protocols for communication with the remote workstations.) Next, application 30a sends the bundle to electronic sticky note management server 22 (step 130). In response, program 72 in server 22 determines from table 43 if the user is authorized to send electronic sticky notes to target workstations 12a and 12b (step 132). Typically, an owner or manager of each workstation are the only people authorized to send electronic sticky notes to the workstation. Also, program 72 determines if each of the selected workstations is currently "on line" by pinging their operating system, or attempting to establish a session and communicate the specified updates with the specified communication protocol (decision 134). For any of the selected workstations that are currently on line and authorized to receive the electronic sticky note (decision 134, yes branch), program 72 creates a file defining the electronic sticky note for display on each selected workstation (step 138). The file specifies the content and manner of display of the electronic sticky note. Program 72 also adds to the file an XML schema or other description of protocol information (such as SOAP) so that each selected workstation knows how to communicate with server 22, in the event that the selected workstation wants to update the electronic sticky note displayed at the selected workstation (step 140). Program 72 makes a record 141 of each workstation that receives the electronic sticky note for display (step 143). Referring again to decision 134, no branch, for any of the selected workstations that were not on line during step 134, program 72 directs server 22 to periodically check if they have come on line by pinging their operating system or attempting to establish a session and communicate the specified updates with the specified communication protocol (step 150). If and when any of these selected workstations come on line (decision 152, yes branch) program 72 proceeds to step 138 to create the file for these selected workstations that have come on line, and then to step 140 to send them the file. Upon receipt of the file at the selected workstations (that are on line), the selected workstation, at the direction of the resident electronic sticky note application, displays the electronic sticky note with the content and according to the display instructions specified in the file (step 155). At the expiration date specified in the instructions, the resident electronic sticky note client application directs that the electronic sticky note be deleted in its workstation and no longer displayed on the display screen.

Figure 3:
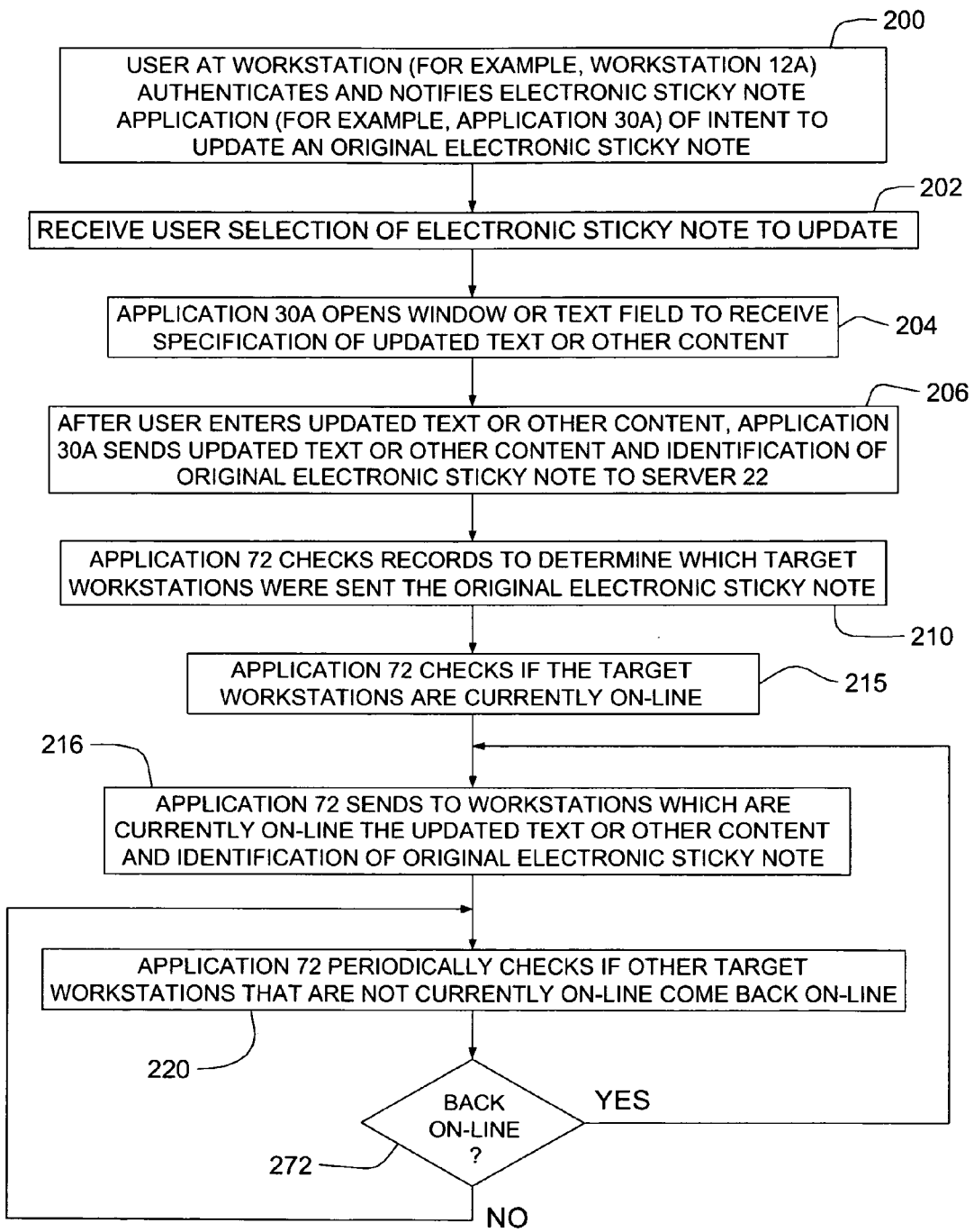
FIG. 3 is a flow chart of each of the electronic sticky note applications and the electronic sticky note management application, in a process of updating an electronic sticky note at one of the workstations and "pushing" it to other workstation(s) to replace the original electronic sticky note.

FIG. 3 illustrates the implementation and function of each of the electronic sticky note client applications 30a,b,c in respective workstations 12a,b,c and electronic sticky note management application 72 in server 22, in the process of updating an existing electronic sticky note which is displayed at two or more workstations, such as workstations 12a,b. In step 200, the user at workstation 12a authenticates himself or herself and notifies application 30a (via a keyboard or mouse and user interface) that the user wants to update an existing electronic sticky note that was created at workstation 12a and is currently displayed at workstations 12a and 12b. It should be noted that the user can update the electronic sticky note at any of the workstations (12a or 12b in this example) that currently displays the original electronic sticky note. The user specifies the electronic sticky note to be updated by selecting it with a mouse cursor (step 202). In response, program 30a (if the user updates the electronic sticky note at workstation 12a, or program 30b if the user updates the electronic sticky note at workstation 12b ) opens a window or text field for the user to enter the updated text, and then the user enters the updated text and enters a "send" command (step 204). In response, program 30a sends the updated text to server 22 along with an indication that these are updates (and not an original electronic sticky note) and an identification of the original electronic sticky note which is being updated (step 206). In response, program 72 checks its records 141 to determine to which workstations that server 22 sent the original electronic sticky note for display (step 210). Next, program 72 directs that server 22 determine which of these workstations are currently on line by pinging their operating system or attempting to establish a session and communicate the specified updates with the specified communication protocol (decision 212). For each of these workstations that is currently on line (and presumably displaying the original electronic sticky note) (step 215), program 72 directs server 22 to send them the updated electronic sticky note (along with display instructions) to replace the original electronic sticky note (step 216). For each of these workstations that is not currently on line, but was previously sent the original electronic sticky note for display, program 72 directs that server 22 periodically check if these workstations have come on line by pinging their operating system or attempting to establish a session and communicate the specified updates with the specified communication protocol (step 220). For any of them that subsequently come on line (decision 222, yes branch), then program 72 loops back to decision 212, yes branch and step 216 to send them the updated electronic sticky note (along with display instructions) to replace the original electronic sticky note.

Figure 2A:
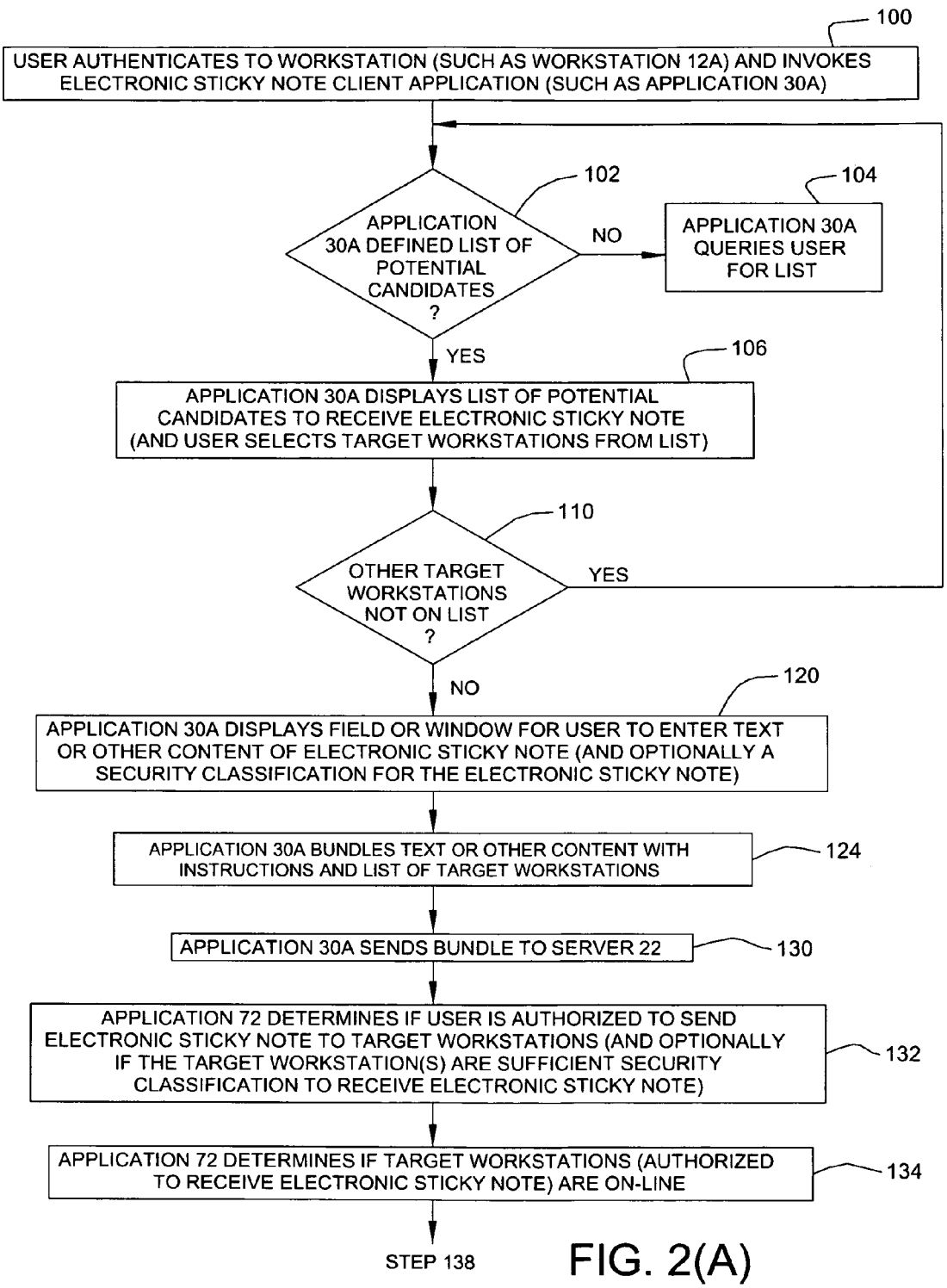
FIGS. 2(A) and 2(B) form a flow chart of each of the electronic sticky note client applications and the electronic sticky note management application, in a process of creating an original electronic sticky note at one of the workstations and "pushing" it to other workstation(s).
Figure 2B:
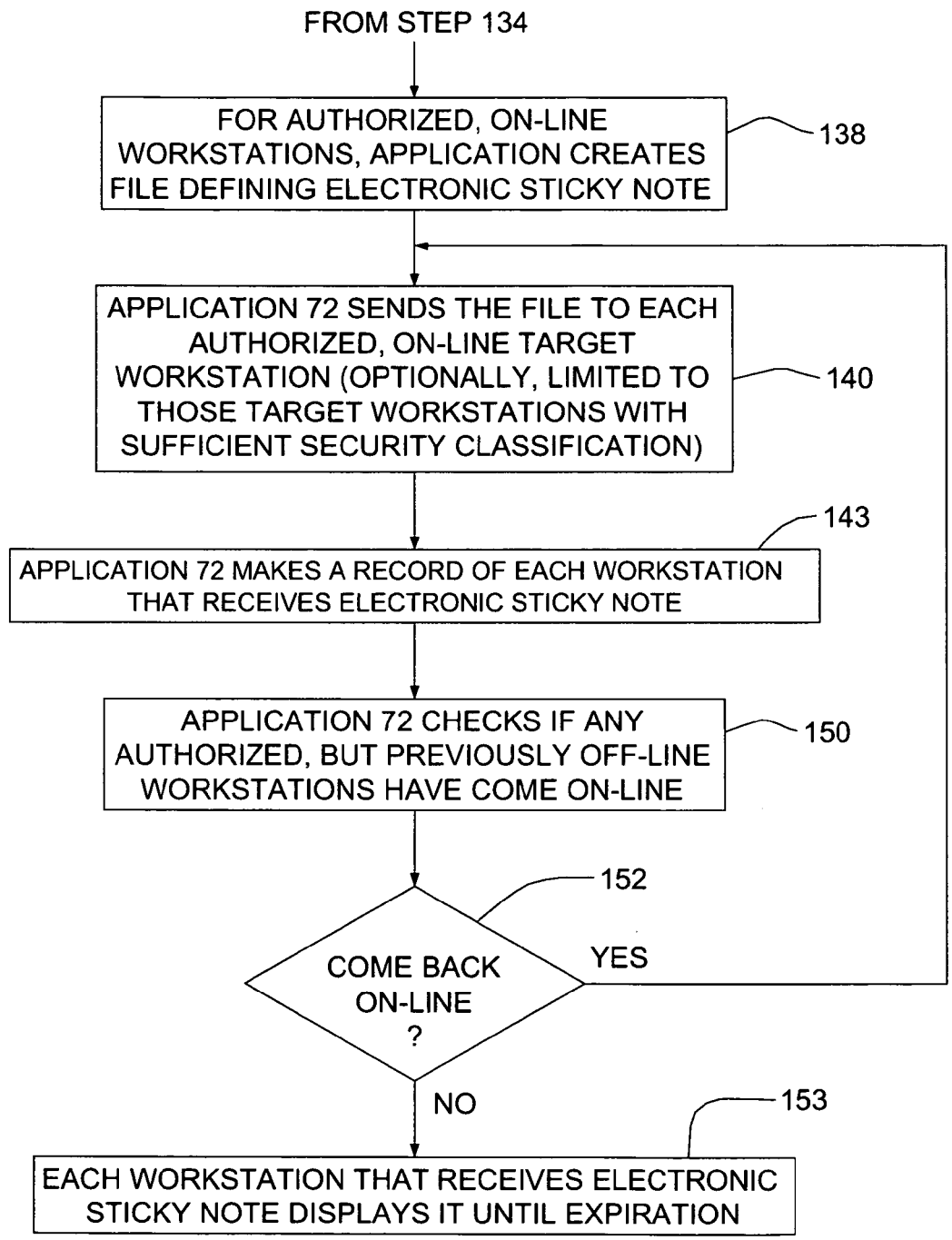

FIGS. 2(A) and 2(B) also illustrate optional features of applications 30a,b,c and application 72 to support security classification for each electronic sticky note and target workstation. With this optional feature when a user defines an electronic sticky note, the user can also specify a security classification for the electronic sticky note in step 120 and bundle this along with the content and instructions for display in the request to the server 22. In response to the security classification, the program 72 would determine if the target workstations have a security classification qualified to receive the electronic sticky note in step 132. In this embodiment of the invention, the security classifications are stored in table 43. If the target workstations are listed in table 43 as being owned or managed by the originator of the electronic sticky note, are on-line and have a security classification qualified to receive the electronic sticky note, then program 72 directs server 22 to send them the electronic sticky note in step 140. For example, the originator of the electronic sticky note can be a manager of multiple employees having respective workstations, and the electronic sticky note pertains to a confidential project that only some of the employees should be aware. In such a case, the security classification of the electronic sticky note may be "restricted", and only those employees with "restricted" security classification are qualified to receive this electronic sticky note. This serves as a check on the selections made by the originator of the electronic sticky note in step 106, in case the manager selected unqualified target workstations in step 106 to receive the electronic sticky note.

Electronic sticky note client applications 30a,b,c can be loaded into respective workstations 12a,b,c from computer readable storage media 92a,b,c such as magnetic disk or tape, optical media, DVD, semiconductor memory, memory stick, etc. or downloaded from the Internet 20 via TCP/IP adapter cards 94a,b,c. The terms "computer readable storage media" and "computer readable storage device" do not include signal propagation media such as a copper cable, optical fiber, or wireless transmission media.

Electronic sticky note management application 72 can be loaded into server 22 from a computer readable storage media 96 such as magnetic disk or tape, optical media, DVD, semiconductor memory, memory stick, etc. or downloaded from the Internet 20 via TCP/IP adapter card 98.

Based on the foregoing, a system, method and program for managing electronic sticky notes have been disclosed. However, numerous modifications and substations can be made without deviating from the scope of the present invention. Therefore, the present invention has been disclosed by way of illustration and not limitation, and reference should be made to the following claims to determine the scope of the present invention.

What is claimed:

1. A method for managing electronic sticky notes, the method comprising:
receiving a definition of an electronic sticky note and a specification of a plurality of workstations to receive and display the electronic sticky note at a server computer from a first workstation via one or more networks, wherein the definition is entered by a user at the first workstation, and wherein the definition includes a security classification the user specified for the electronic sticky note, and wherein the security classification in the definition identifies the electronic sticky note as having classified information that can only be accessed at particular workstations that have the security classification the user specified for the electronic sticky note for accessing the classified information;

in response to receipt of the definition of the electronic sticky note and the specification of the plurality of workstations to receive and display the electronic sticky note, the server computer identifying a group of workstations in the plurality of workstations that have the security classification the user specified for the electronic sticky note;

the server computer sending a request, via the one or more networks, to the group of workstations identified in the plurality of workstations to display the electronic sticky note, wherein the server computer creates a record of each workstation that receives the electronic sticky note, and wherein the request includes the definition of the electronic sticky note further comprising a description of protocol information enabling each workstation identified to communicate with the server computer; and the server computer not sending the request, to other workstations of the plurality of workstations that do not have the security classification the user specified for accessing the classified information in the electronic sticky note, to display the electronic sticky note.

2. The method as set forth in claim 1, wherein in response to receipt of the definition of the electronic sticky note and the specification of the plurality of workstations to receive and display the electronic sticky note, further comprising:

the server computer verifying the group of workstations is currently on line, by one of pinging an operating system of a respective workstation, or attempting to establish a session and communicate specified updates with a specified communication protocol, before the server computer sending the request to the group of workstations.

3. The method as set forth in claim 1, wherein in response to receipt of the definition of the electronic sticky note and the specification of the plurality of workstations to receive and display the electronic sticky note, further comprising:

the server computer verifying that the user is authorized to send the electronic sticky note to the group of workstations before the server computer sending the request to the group of workstations.

4. The method as set forth in claim 1, wherein the request also includes instructions to display the electronic sticky note at the plurality of workstations, wherein the instructions for displaying content of the electronic sticky note include instructions comprising remove all graphics, bold title text, a date upon which the electronic sticky note should be deleted and the date upon which the electronic sticky note should no longer be displayed.

5. The method as set forth in claim 1 further comprising:
receiving a notification from the first workstation of updated content of the electronic sticky note, and
in response to receiving the notification, the server computer sending to the group of workstations the updated content for the electronic sticky note.

6. The method as set forth in claim 1 further comprising:
the server computer receiving instructions for displaying the electronic sticky note; and
the server computer sending to the group of workstations the instructions for displaying the electronic sticky note, wherein the instructions for displaying content of the electronic sticky note include instructions comprising remove all graphics, bold title text, a date upon which the electronic sticky note should be deleted and the date upon which the electronic sticky note should no longer be displayed.

7. The method as set forth in claim 1 wherein the user owns the plurality of workstations.

8. The method as set forth in claim 1 further comprising:
in response to the server computer receiving a notification from one or more of the plurality of workstations other than the first workstation of updated content of the electronic sticky note, the server computer sending to the group of workstations the updated content for the electronic sticky note.

9. The method of claim 1, wherein the security classification is one of restricted or not restricted.

10. The method of claim 1, wherein the server computer removes from the group of workstations a portion of the group of workstations that is not at least one of owned by the user and managed by the user.

11. A system for managing electronic sticky notes, the system comprising:
a server computer including a CPU, a non-transitory computer readable storage media, and a memory;
first program instructions to receive at the server computer from a first workstation via one or more networks, a definition, entered by a user, of an electronic sticky note and a specification of a plurality of workstations to receive and display the electronic sticky note, wherein the definition includes a security classification the user specified for the electronic sticky note, and wherein the security classification in the definition identifies the electronic sticky note as having classified information that can only be accessed at particular workstations that have the security classification the user specified for the electronic sticky note for accessing the classified information;
second program instructions, responsive to receipt of the definition of the electronic sticky note and the specification of the plurality of workstations to receive and display the electronic sticky note, to identify a group of workstations in the plurality of workstations that have the security classification the user specified for the electronic sticky note;
third program instructions to send a request, via the one or more networks, to the group of workstations identified in the plurality of workstations to display the electronic sticky note, wherein the server computer creates a record of each workstation that receives the electronic sticky note, and wherein the request includes the definition of the electronic sticky note further comprising a description of protocol information enabling each workstation identified to communicate with the server computer; and
fourth program instructions to not send the request, to other workstations of the plurality of workstations that do not have the security classification the user specified for accessing the classified information in the electronic sticky note, to display the electronic sticky note, wherein the first program instructions, the second program instructions, the third program instructions and the fourth program instructions are stored in the non-transitory computer readable storage media for execution by the CPU via the memory in the server computer.

12. The system as set forth in claim 11 wherein the third program instructions to send the request to the group of workstations further include program instructions to verify that the group of workstations are currently on line, by one of pinging an operating system of a respective workstation, or attempting to establish a session, and communicate specified updates with a specified communication protocol, before sending the request to the group of workstations.

13. The system as set forth in claim 11 wherein the third program instructions to send the request to the group of workstations further include program instructions to verify the user is authorized to send the electronic sticky note to the group of workstations before sending the request to the group of workstations.

14. The system as set forth in claim 11 wherein:
the server computer includes fifth program instructions to receive a notification to update content of the electronic sticky note, wherein the fifth program instructions are stored in the non-transitory computer readable storage media for execution by the CPU via the memory in the server computer; and
the server computer includes sixth program instructions, responsive to receiving the notification from the first workstation to update the content for the electronic sticky note, to send to the group of workstations the updated content for the electronic sticky note, wherein the sixth program instructions are stored in the non-transitory computer readable storage media for execution by the CPU via the memory in the server computer.

15. The system as set forth in claim 11 wherein:
the server computer includes seventh program instructions to receive from the first workstation instructions to display the electronic sticky note, wherein the instructions for displaying content of the electronic sticky note include instructions comprising remove all graphics, bold title text, a date upon which the electronic sticky note should be deleted and the date upon which the electronic sticky note should no longer be displayed, wherein the seventh program instructions are stored in the non-transitory computer readable storage media for execution by the CPU via the memory in the server computer; and
the server computer includes eighth program instructions to send to the plurality of workstations the instructions for how to display the electronic sticky note, wherein the eighth program instructions are stored in the non-transitory computer readable storage media for execution by the CPU via the memory in the server computer.

16. The system as set forth in claim 11 wherein the user owns the plurality of workstations.

17. The system as set forth in claim 11 wherein:
the server computer includes ninth program instructions, responsive to receiving from one or more of the plurality of workstations other than the first work station a notification of updated content of the electronic sticky note, to send to the group of workstations the updated content for the electronic sticky note, wherein the ninth program instructions are stored in the non-transitory computer readable storage media for execution by the CPU via the memory in the server.

18. A computer program product for managing electronic sticky notes, the computer program product comprising a non-transitory computer readable storage medium having program instructions stored thereon for execution by a server computer, the program instructions comprising;
first program instructions, for execution in the server computer, to receive from a first workstation via one or more networks, a definition, entered by a user at the first workstation, content of an electronic sticky note and a specification of a plurality of workstations to receive and display the electronic sticky note, wherein the definition includes a security classification the user specified for the electronic sticky note, and wherein the security classification in the definition identifies the electronic sticky note as having classified information that can only be accessed at particular workstations that have the security classification the user specified for the electronic sticky note for accessing the classified information;
second program instructions, for execution in the server computer, responsive to receipt of the definition of the electronic sticky note and the specification of the plurality of workstations to receive and display the electronic sticky note, to identify a group of workstations in the plurality of workstations that have the security classification the user specified for the electronic sticky note;
third program instructions to initiate sending of a request by the server computer, via the one or more networks, to the group of workstations identified in the plurality of workstations to display the electronic sticky note, wherein the server computer creates a record of each workstation that receives the electronic sticky note, and wherein the request includes the definition of the electronic sticky note further comprising a description of protocol information enabling each workstation identified to communicate with the server computer; and
fourth program instructions to not send the request, to other workstations of the plurality of workstations that do not have the security classification the user specified for accessing the classified information in the electronic sticky note, to display the electronic sticky note.

19. The computer program product as set forth in claim 18 further comprising:
fifth program instructions, for execution within the server computer, to verify that the group of workstations are currently on line, by one of pinging an operating system of a respective workstation, or attempting to establish a session and communicate specified updates with a specified communication protocol, before sending the request to the group of workstations; and
wherein the fifth program instructions are stored on the non-transitory computer readable storage medium.

20. The computer program product as set forth in claim 18 further comprising:
sixth program instructions, for execution within the server computer, to verify that the user is authorized to send the electronic sticky note to the group of workstations before sending the request to the group of workstations; and
wherein the sixth program instructions are stored on the non-transitory computer readable storage medium.

\* \* \* \* \*